United States Patent
Lee

(10) Patent No.: US 8,709,378 B2
(45) Date of Patent: Apr. 29, 2014

(54) CATALYST AND PROCESS OF HYDROCARBON FEEDSTOCK REFORMATION TO HYDROGEN AND CARBON MONOXIDE

(75) Inventor: Ivan Chihang Lee, Odenton, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1821 days.

(21) Appl. No.: 12/014,910

(22) Filed: Jan. 16, 2008

(65) Prior Publication Data

US 2014/0073499 A1 Mar. 13, 2014

(51) Int. Cl.
*C01B 33/36* (2006.01)
*C01B 39/00* (2006.01)
*C01B 3/26* (2006.01)

(52) U.S. Cl.
USPC ............ 423/700; 423/711; 423/713; 423/651

(58) Field of Classification Search
None
See application file for complete search history.

(56) References Cited

U.S. PATENT DOCUMENTS

| | | | |
|---|---|---|---|
| 3,929,672 A * | 12/1975 | Ward | ............................... 502/66 |
| 4,087,259 A | 5/1978 | Fujitani et al. | |
| 4,873,211 A * | 10/1989 | Walker et al. | ................... 502/64 |
| 5,134,109 A | 7/1992 | Uchiyama et al. | |
| 5,270,272 A | 12/1993 | Galperin et al. | |
| 6,190,430 B1 | 2/2001 | Fukuoka et al. | |
| 6,221,280 B1 | 4/2001 | Anumakonda et al. | |
| 6,238,816 B1 | 5/2001 | Cable et al. | |
| 6,967,063 B2 | 11/2005 | Krumpelt et al. | |
| 7,160,533 B2 | 1/2007 | Hagemeyer et al. | |
| 7,160,534 B2 | 1/2007 | Hagemeyer et al. | |
| 7,179,442 B2 | 2/2007 | Hagemeyer et al. | |
| 2002/0182457 A1 * | 12/2002 | Clawson et al. | ................. 429/17 |
| 2003/0113248 A1 * | 6/2003 | Mohr et al. | ................. 423/213.2 |
| 2009/0087367 A1 * | 4/2009 | Liu et al. | ....................... 423/237 |

OTHER PUBLICATIONS

F.E. Trigueiro et al., Thermal stability of Y zeolites containing different rare earth cations, Journal of Alloys and Compounds 344 (2002) 337-341.
T.J. Campbell et al., JP-8 catalytic cracking for compact fuel processors, Journal of Power Sources 129 (2004) 81-89.
J. Ashok et al., COx-free H2 production via catalytic decomposition of CH4 over Ni supported on zeolite catalysts, Journal of Power Sources 164 (2007) 809-814.
M. Santikunaporn et al., Ring opening of decaline and tetralin on HY and Pt/HY zeolite catalysts, Journal of Catalysis 228 (2004) 100-113.
I.C. Lee et al., Determination of sulfur contaminants in military jet fuels, Fuel (2007).

(Continued)

*Primary Examiner* — Bijay Saha
(74) *Attorney, Agent, or Firm* — Richard A. Morgan; Christos S. Kyriakou; Eric B. Compton

(57) ABSTRACT

A catalytic composition is particularly well suited for hydrocarbon conversion to synthesis gas at a temperature of between 800 and 1000° Celsius. The catalytic composition includes a noble metal cluster having an X-Y-Z axial mean linear dimension of between 2 and 15 Angstroms and a super cage structure surrounding the noble metal cluster. The super cage structure stabilizes the noble metal cluster against aggregation at temperatures of 1000° Celsius. A process for reforming hydrocarbon feedstock to hydrogen and carbon monoxide is also provided that conversion to greater than 80% of theoretical yield.

24 Claims, 6 Drawing Sheets

(56) References Cited

OTHER PUBLICATIONS

R. Hua et al. Determination of sulfur-containing compounds in diesel oils . . . , Journal of Chromatography A, 1019 (2003) 101-109.

L.R.M. Martens et al., Preparation and catalytic properties of ionic sodium clusters in zeolites, Nature (1985) 315, 568-570.

S.V. Pol et al., Synthesis of WC Nanotubes, Advanced Materials, (2006), 18, 2023-2027.

Sun et al., "Methanol dehydration to dimethyl ether in a staged autothermal millisecond residence time reactor" Applied Catalysis A: General 404 (2011) 81-86.

* cited by examiner

CATALYST AND PROCESS OF HYDROCARBON FEEDSTOCK REFORMATION TO HYDROGEN AND CARBON MONOXIDE

GOVERNMENT INTEREST

The invention described herein may be manufactured, used, and licensed by or for the United States Government without payment of a fee therefor.

FIELD OF THE INVENTION

The invention relates to conversion of a hydrocarbon feedstock to synthesis gas and in particular to a sulfur-tolerant catalyst.

BACKGROUND OF THE INVENTION

The production and transport of hydrogen for field applications remains a logistical problem. The low energy density of hydrogen necessitates larger containers for storage and transport relative to those for hydrocarbon fuel. Even with high pressurization of 10,000 pounds per square inch or metal hydride storage, a relatively large container is required to hold an energy equivalent of hydrogen. As a result, the use of hydrogen to operate a quiet and environmentally benign electricity generator in the field necessitates on site generation of hydrogen.

The term "reformation" is used in the petroleum refining industry to refer to catalytic conversion of lower octane naphtha to higher octane naphtha with the production of hydrogen co-product. The term "reformation" is used herein to describe reaction of a hydrocarbon fuel stock, liquid at standard temperature and pressure (STP), to form hydrogen and carbon monoxide, referred to as synthesis gas or syngas. Unfortunately, existing technologies for fuel reformation to syngas have met with limited acceptance. For example, the invention of U.S. Pat. No. 6,221,280 requires an anhydrous environment, air as an oxidant and a fuel reformation temperature of greater than 1050° Celsius.

Another impediment to reformation of fuel to syngas is catalyst intolerance to sulfur. These catalysts contain transition metals that form sulfides on exposure to sulfur at elevated reformation temperatures. The sulfided catalyst is catalytically inactive, referred to as poisoned.

Attempts to catalytically reform sulfur-containing hydrocarbon fuels have included sulfur removal from the hydrocarbon fuel prior to exposure to the reformation catalyst as described in U.S. Pat. No. 5,270,272 and sulfur-tolerant catalyst as described in U.S. Pat. No. 6,238,816 and U.S. Pat. No. 6,967,063. Unfortunately, hydrocarbon fuel desulfurization prior to fuel reformation adds processing steps and has proven only incrementally successful. Sulfur-tolerant catalysts usually require large amounts of water as an oxidant, adding a containment and transport burden. These catalysts may also demonstrate low syngas yields. All of these are significant impediments for the military to use sulfur-containing fuels for field generation of electricity.

There is a need for a catalyst to directly convert sulfur-containing hydrocarbon fuels to synthesis gas at temperatures in the range of 800 to 1000° Celsius.

SUMMARY OF THE INVENTION

A catalytic composition particularly well suited for hydrocarbon reformation at a temperature of between 800 and 1000° Celsius includes a noble metal cluster having an X-Y-Z axial mean linear dimension of between 2 and 15 Angstroms and a structure surrounding the noble metal cluster. The structure stabilizes the noble metal cluster against aggregation of noble metal clusters at temperatures up to 1000° Celsius. The structure has an exterior surface area, an interior volume having an interior cross-sectional dimension of 36 to 225 square Angstroms and a passage providing fluid communication for transport of hydrocarbons having at least 6 carbon atoms between the exterior and the noble metal cluster and for transport of synthesis gas out of the structure.

A process for reforming hydrocarbon feedstock to hydrogen and carbon monoxide is also provided that includes preheating a catalytic composition to a temperature of between 250 and 400° Celsius. Heat generated from the reformation reaction raises the temperature of the catalytic composition to 800 to 1000° Celsius. The catalytic composition includes a support to which noble metal is adhered as well as a structure having an exterior and an interior volume and an opening providing fluid communication between the exterior and the interior volume. Reformation takes place on contacting the hydrocarbon feedstock, air and optionally water with the catalytic composition at reaction temperature for a period of time.

DETAILED DESCRIPTION OF THE PREFERRED EMBODIMENTS

Figure 1:
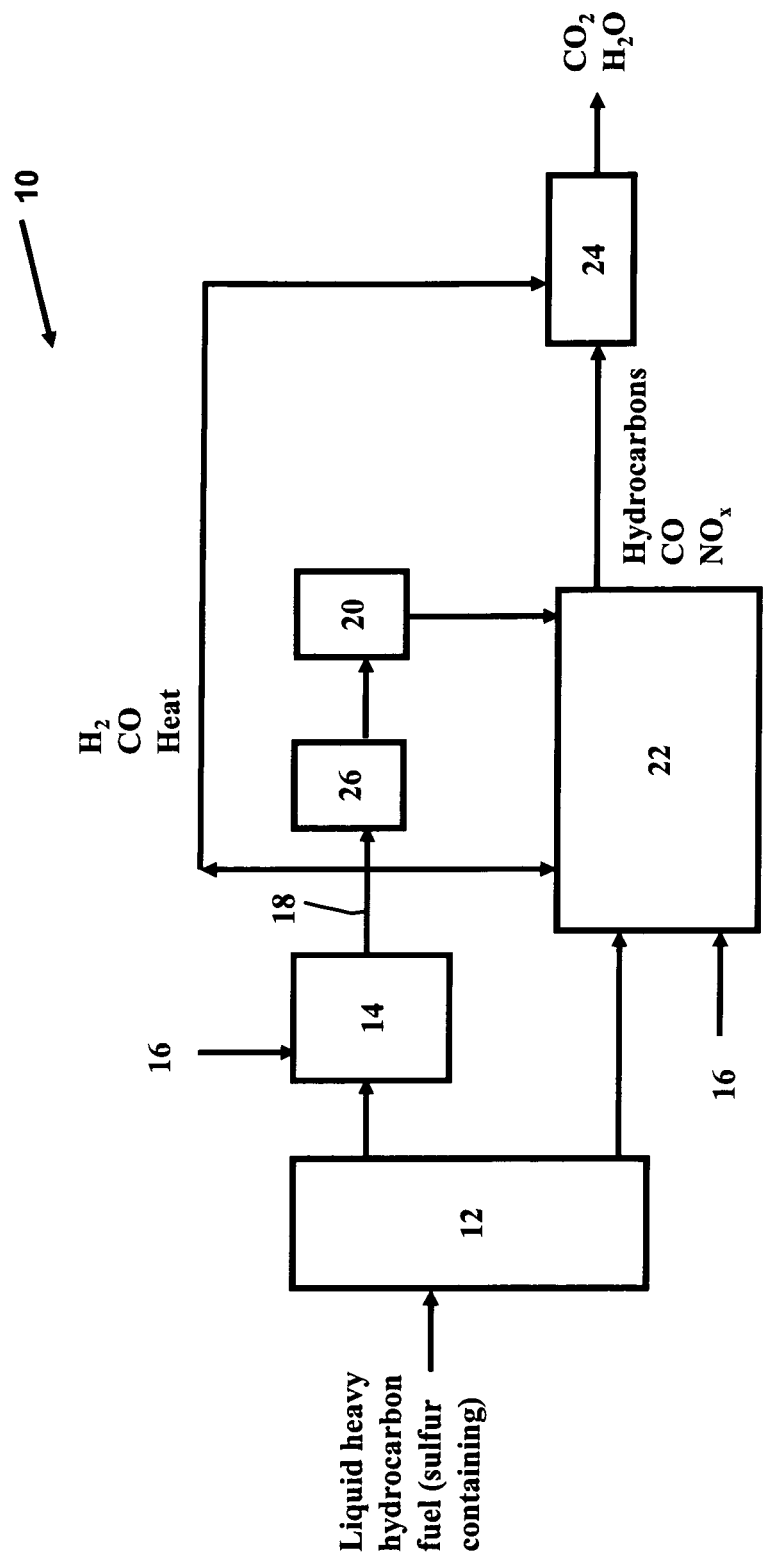
FIG. 1 is a schematic diagram of a process according to the invention.

The invention has utility for catalytic reformation of a sulfur-containing hydrocarbon feedstock to hydrogen and carbon monoxide. Hydrocarbon feedstocks include Jet-A, Jet-A1, JP-4, JP-5, JP-8, kerosene, gasoline, and diesel fuel. Catalytic compositions are provided that allow reformation of the sulfur-containing hydrocarbon feed stocks to a hydrogen and carbon monoxide rich product. Reformation temperature is in the range of 800 to 1000° Celsius. This reformation temperature is lower than previously useful for successful hydrocarbon feedstock reformation. Reformation at 800 to 1000° Celsius occurs by means of a catalytic material containing a noble metal cluster attached to a structure adhered to a support. The structure has an exterior and an interior volume with an opening providing for hydrocarbon flow.

The inventive process includes mixing a sulfur-containing hydrocarbon feedstock with an oxygen donor gas to form a reactant stream. The reactant stream is exposed to the catalytic composition at a temperature between 250 and 400° Celsius to form hydrogen and carbon monoxide by breaking hydrocarbon C—C and C—H bonds to form H—H and C—O. A catalytic composition includes a noble metal cluster and a structure having an interior volume and an opening extending between the structure exterior and the interior volume to provide fluid communication. A hydrocarbon feedstock is reformed in the presence of sulfur at a lower temperature with yields greater than 80% of theoretical. There is only limited coking, that is, deposition of amorphous or graphitic carbon onto the catalytic composition.

The term "hydrocarbon feedstock" is defined as hydrocarbon molecules having at least 6 carbon atoms. Carbon-carbon bonds contained therein are linear, branched, cyclic, or ethylenically unsaturated. A hydrocarbon feedstock according to the invention is contemplated to include organosulfur compounds, although organosulfur compounds in no way benefit the operation of the inventive process or catalyst. The inventive catalytic process and catalyst yield synthesis gas in the presence of sulfur contaminates. The quantity and identity of sulfur contaminants in military jet fuel and diesel fuel are known. The quantity of sulfur ranges from 0 ppmw to 3000 ppmw, typically 500 ppmw to 1500 ppmw. The average sulfur content is nominally 1000 ppmw (parts per million by weight). I. C. Lee et al., "Determination of sulfur contaminants in military jet fuels," Fuel (2007), doi:10.1016/j.fuel.207.05.010. R. X. Hua et al., "Determination of sulfur-containing compounds in diesel oils by comprehensive two-dimensional gas chromatography with a sulfur chemiluminescence detector" J. Chromatography A 2003; 1019:101-9. It is appreciated that other heteroatomic contaminants may also exist in a hydrocarbon fuel with other hetero atoms including oxygen, nitrogen, chlorine, phosphorus, as well as trace quantities of various metals.

An inventive catalytic composition for a hydrocarbon feedstock reformation may include a solid catalyst support surface. Support materials operative herein include gamma-alumina, zirconia, alpha-alumina, ceria, and titania. It is appreciated that the nature of the support is generally not critical and is limited only by the attribute of stability over a prolonged exposure to temperatures of between 800 and 1000° Celsius in contact with reactant gas stream and reformation products. Differences in porosity and structure of a catalytic support can influence reaction kinetics. It is known in the art that porosity of a catalytic support can be selected to be non-limiting for catalytic reaction kinetics. Non-limiting porosity is preferred. Noble metal catalyst in the form of particulates or a coating is adhered to the catalytic support either directly or through a structure. The noble metal is rhodium, platinum, palladium, iridium or an alloy containing one or more of these metals. The preferred noble metal is rhodium. Noble metal catalyst loading on the catalytic support is typically between 1 and 25 total weight percent of the catalytic composition. Factors such as the nature of the hydrocarbon feedstock, the catalyst operating temperature, the surface area of the noble metal catalyst component, and whether the noble metal catalyst component is attached to the outer surface of the structure or within the interior volume of the structure are all relevant in determining the amount of noble metal catalyst available for catalysis. In one example, the noble metal catalyst has a surface area of 340 meters squared per gram and is adhered directly to the catalytic structure, the noble metal catalyst preferably comprising from 0.03 to 5 total weight percent of the catalytic composition. It is appreciated that other loadings of noble metal catalyst may be used. That is, lesser amounts of catalyst are compensated for by increasing exposure time between the catalytic composition and reactant gas at a given temperature.

While a noble metal catalyst is known to reform hydrocarbon feedstock at temperatures above 1050° Celsius (U.S. Pat. No. 6,221,280), the present invention achieves hydrocarbon reformation at temperatures of less than 1000° Celsius and typically between 800 and 1000° Celsius, by means of the noble metal cluster and the enclosing structure. The structure comprising an interior volume is selected from the group consisting of a zeolite, an open ended hollow nanotube, an ion implanted wafer and a fullerene. One zeolite useful as a structure is a Faujasite zeolite synonymously known as zeolite Y. Zeolite Y is readily treated to include metal atoms within the zeolite cage, referred to as zeolite MY. A particularly common form is sodium modified Y zeolite, referred to as NaY. Martins et al. Nature (1985) 315, 568. Zeolite Y is formed of sodalite units of silica and alumina that define an opening and an interior super cage volume. An opening size of between 2.6 and 80 Angstroms and maximal opening linear dimension is required while the interior volume of the zeolite has a diameter of between 2 and 15 Angstroms. Due to inadequate thermal stability and catalytic activity towards hydrocarbon reformation associated with NaY zeolite, the zeolite preferably incorporates rare earth elements. Rare earth elements useful herein include samarium (Sm), lanthanum (La), cerium (Ce), dysprosium (Dy), erbium (Er), gadolinium (Gd), and combinations thereof. The preferred rare earth atoms are samarium (Sm), dysprosium (Dy) and erbium (Er). The preferred amounts are 10 ppmw to 2 wt % samarium (Sm), 40 ppmw to 3 wt % dysprosium (Dy) and 20 ppmw to 3 wt % erbium (Er). The upper value of the amount of rare earth element is the saturation amount. Rare earth containing Y zeolite is thermally stable at operating temperatures of 800 to 1000° Celsius and provides a catalytically active site for hydrocarbon reformation. A preferred structure is a rare earth stabilized Y zeolite having an exterior surface area of between 170 and 350 meters$^2$ per gram at 925° Celsius.

While the invention is described with respect to a zeolite structure based on Y zeolite, other zeolites are also operative in the invention such as L zeolite (LTL).

Tungsten carbide (WC) or titanium carbide nanotubes also are suitable structures in the inventive catalytic composition and are readily produced at a temperature of between 1400 and 1600° Celsius according to standard techniques. S. V. Pol, V. G. Pol, A. Gedanken, Synthesis of WC Nanotubes, Advanced Materials, (2006) 18(15), 2023-2027.

A tungsten carbide nanotube forms a hollow thin walled structure that participates in hydrocarbon feedstock reformation at between 800 and 1000° Celsius. The nanotubes useful herein have a length of typically between 30 and 1000 Angstroms. Orientation of the nanotubes on a support appears to have little effect on hydrocarbon feedstock reformation. Nanotubes may make up from 1 to 20 total weight percent of the catalytic composition. The nanotube interior is modified to include a noble metal cluster. It is appreciated that a noble metal cluster is also provided on the exterior of a nanotube although the presence of the noble metal clusters within the carbide nanotube appears to provide a superior effect. Typically, the carbide nanotube has a free interior diameter of between 30 and 70 Angstroms.

A catalytic composition according to the invention demonstrates superior hydrocarbon feedstock reformation by restricting the noble metal cluster size to a size of between 2 and 15 Angstroms in the X-Y-Z axis mean linear dimension. X-Y-Z axial mean linear dimension is a term used to describe the mean diameter of anisotropic particles. For isotropic particles such as spherical particles, X-Y-Z axial mean linear dimension and diameter are numerically equal. While the formation of noble metal clusters having an X-Y-Z axis mean linear dimension of between 2 and 15 Angstroms is readily formed by conventional techniques, those of the invention form the noble metal cluster of between 2 and 15 Angstroms within the structure interior volume. The opening in the structure provides fluid communication for the hydrocarbon feedstock to the noble metal cluster within the interior volume of the structure, allowing catalysis. Catalysis proceeds at a reaction temperature between 800 and 1000° Celsius, preferably 875 to 950° Celsius, less than that previously attainable. The catalytic reaction is achieved with long-term stability and inhibited aggregation or migration of noble metal cluster atoms under operating conditions to form clusters larger than those having a mean linear dimension in X-Y-Z directions of between 2 and 15 Angstroms. Aggregation is also referred to as agglomeration. Preferably, noble metal clusters of between 2 and 15 Angstroms having a generally spherical shape are formed within a super cage of a rare earth modified Y zeolite. In the alternative, the noble metal cluster may be surrounded by a metal carbide nanotube, such as a tungsten carbide (WC) or a titanium carbide nanotube.

The integration of an inventive catalytic composition and reformation process into a fuel system is shown schematically in FIG. 1. System 10 includes a liquid fuel tank 12 containing a liquid hydrocarbon fuel stock including substantial amounts of organosulfur compounds. These fuel stocks include such fuels as Jet-A, Jet-A1, JP-4, JP-5, JP-8, kerosene, gasoline and diesel fuel. The fuel tank 12 is in fluid communication with a reformer 14 containing a catalytic composition as described herein including a support, a noble metal, and a support structure. Preferably, noble metal clusters are retained within the structure permitting hydrocarbon feedstock communication by way of the structure to the noble metal cluster having a mean linear dimension in X-Y-Z axial directions of between 2 and 15 Angstroms. The reformer 14 is maintained at a temperature of between 800 and 1000° Celsius during operation. An air supply 16 may be any source of oxygen such as a pressurized canister containing an oxygen atom liberating gas. Besides oxygen, other gases suitable for oxygen extraction to form carbon monoxide from hydrocarbon feedstock include hydrogen peroxide, water, and carbon dioxide. Preferably, the oxygen reactant from supply 16 and hydrocarbon feedstock from the fuel tank 12 are premixed before introduction into the reformer 14. Reformer output includes a hydrogen and carbon monoxide rich gaseous product. The output 18 is fuel provided to fuel cell 20 or engine 22. Engine 22 may be an internal combustion engine, a turbine, and an electrical generator. Preferably, fuel cell 20 is a solid oxide fuel cell (SOFC). Due to the susceptibility of many fuel cells to sulfur poisoning, the hydrogen sulfide absorbent material 26 is preferably placed intermediate between the output 18 and the fuel cell 20. A simultaneous or as an alternative to output 18 supplied to the fuel cell 20 is output 18 supplied to an engine 22. In this way, a flexible electric power system is provided. Air or other suitable oxygen atom donor gas is provided to the fuel cell 20 or engine 22 to facilitate electrochemical combination and combustion, respectively. Optionally, the unreacted hydrogen from the fuel cell 20 is supplied to the engine 22 to improve performance of the engine 22. Combustion byproducts from the engine 22 inclusive of uncombusted hydrocarbons, carbon monoxide, and various nitrogen oxides ($NO_x$) are optionally supplied to a catalytic converter 24 conventional in the art such as those inclusive of a noble metal catalyst to produce carbon dioxide and water. In order to maintain a catalytic converter 24 at a suitable catalytic operating temperature and/or to preclude unneeded carbon monoxide from going to the atmosphere, output 18 may be provided directly to the catalytic converter 24 simultaneous with, or exclusive of output 18 flows to one or both of the fuel cell 20 and engine 22.

Control of the carbon to oxygen ratio ($C/O_{air}$, or simply C/O) is known to affect various aspects of the reformation process including yields of hydrogen and carbon monoxide gases and graphitic carbon formation. According to the inventive process it is preferred that a C/O ratio is maintained generally above 0.5. Preferably, the C/O ratio is from 0.5 to 1 and more preferably from 0.6 to 0.95. A C/O ratio of less than 0.5 favors excessive oxidation to yield carbon dioxide and water at the expense of hydrogen and carbon monoxide gases. A C/O ratio above 1 tends to yield incomplete conversion and graphitic coke formation as well as undesired side reactions, especially those involving organosulfur compounds.

The invention is further described with respect to the following examples which are not intended to limit the scope of the appended claims and merely provide exemplary compositions and processes according to the present invention.

EXAMPLE

Example 1

Formation of Thermally Stabilized Rare Earth NaY Zeolite 50 grams of NaY zeolite was added to 200 milliliters of 2 molar ammonium nitrate aqueous solution and allowed to ion exchange with mechanical stirring for 22 hours at 20° Celsius. The suspension was centrifuged at 1500 revolutions per minute for 10 minutes and the resultant solid washed with deionized water. Centrifuging and washing were then repeated twice. The procedure of ammonium nitrate exchange-centrifuging-washing-centrifuging-washing-centrifuging-washing was then repeated twice. Solid ammonium-Na—Y zeolite was collected and dried in vacuo at 60° Celsius for 5 hours and then at 120° Celsius for 1 hour. The ammonium-NaY zeolite was then ion exchanged with nitrate solutions of various rare earth elements at concentrations of 0.1 molar, 0.2 molar, or 0.4 molar each for 68 hours at which the molarity reflects concentration of the rare earth elements present.

Where mixed rare earth elements are introduced, concentration is cumulative. By way of example, ammonium-NaY zeolite was exposed for ion exchange for 68 hours to a solution containing 0.05 molar samarium nitrate and 0.05 molar erbium nitrate to yield a total rare earth ion exchange solution concentration of 0.1 molar. After the 68 hour ion exchange period the centrifuging-washing sequence was repeated three times followed by collection of a solid rare earth (RE) stabilized NaY zeolite (RE-NaY) and dried in vacuo at 60° Celsius for 5 hours and then at 120° Celsius for 1 hour. The surface area associated with rare earth stabilized Y zeolites produced with 0.4 molar solutions of each of six rare earth element nitrates is reported in Table 1.

TABLE 1

Rare Earth Stabilized Y Zeolite Surface Area

| Rare Earth Metal | Surface Area ($m^2/g$) at 925° C. |
|---|---|
| Sm | 340 |
| La | <10 |
| Ce | <10 |
| Dy | 172 |
| Er | 349 |
| Gd | <10 |

Weight percent of exemplary rare earth metals and the surface area as measured at 925° Celsius is reported in Table 2 as a function of the rare earth nitrate solution concentration used to perform exchange with ammonium-NaY zeolite. The values found in Table 2 were measured by inductively coupled plasma mass spectroscopy and BET (Burnauer, Emmett, Teller) surface area analysis.

TABLE 2

Surface Area and Rare Earth Weight Percent as a Function of Exchange Solution Concentration

| Wt % Surface area at 925° C. ($m^2/g$) | Sm | Dy | Er |
|---|---|---|---|
| 0.4M | 0.00193% | 0.00553% | 0.00312% |
| | 340 $m^2/g$ | 172 $m^2/g$ | 349 $m^2/g$ |
| 0.2M | 0.00236% | 0.00524% | 0.00291% |
| | 72 $m^2/g$ | 253 $m^2/g$ | 484 $m^2/g$ |
| 0.1M | 0.00146% | 0.00465% | 0.00234% |
| | <10 $m^2/g$ | 285 $m^2/g$ | 53 $m^2/g$ |

Example 2

Preparation of Metal Cluster Inside Zeolite Super Cage

NaY or rare earth (RE) stabilized NaY zeolite of Example 1 was calcined with air flowing at 300° Celsius for 12 hours. The calcined NaY zeolite with or without rare earth exchange for sodium was degassed in a vacuum furnace at 250° Celsius for 12 hours and upon cooling was transferred along with all reagents to an argon blanketed glove box. A quantity of rhodium dicarbonyl acetyl acetate, $Rh(CO)_2(acac)$, was dissolved in pentane under argon. Acac refers to the anion of acetyl acetate. Degassed zeolite was then added to the flask and stirred at room temperature for 3 days. The solid from the flask was then transferred to an airtight quartz tube reactor and annealed with 5% carbon monoxide in argon at 125° Celsius for 8 hours. Thereafter the solid zeolite was annealed under helium at 200° Celsius for 12 hours to yield a zeolite with a rhodium metal cluster having a diameter of 3.1 Angstroms located within the super cage of the NaY zeolite or rare earth exchanged NaY zeolite.

Example 3

(Prophetic)—Preparation of Noble Metal Cluster Inside WC Nanotube 1 gram of tungsten carbide (WC) nanotubes is degassed in a vacuum furnace 250° Celsius for 12 hours and subjected to exposure to a noble metal compound dissolved in pentane according to the procedure of Example 2 to produce rhodium metal clusters having a mean size of 3.1 Angstroms in diameter within the tungsten carbide nanotubes.

Example 4

Prophetic

The procedure of Example 3 is repeated with platinum acetyl acetate ($Pt(acac)_2$) to achieve a platinum loading of 0.03 total weight percent of tungsten carbide nanotubes as measured by inductively coupled plasma mass spectroscopy.

Example 5a

Noble Metal and NaY Zeolite Catalytic Composition

A pentane based slurry of 0.25 grams of NaY zeolite powder was added to 6.1 grams of gamma alumina foam with mechanical stirring. On solvent evaporation the result was a coating on the alumina foam. The coated foam was calcined in air at 750° Celsius for 15 hours. On cooling, the calcined powder was coated with 0.25 grams of rhodium nitrate in a solution of water that on solvent evaporation resulted in coating with rhodium nitrate and hydrates thereof. The resultant zeolite and rhodium nitrate coated alumina foam was calcined at 750° Celsius for 15 hours to yield a catalytic composition identified as Catalyst 2. The rhodium metal cluster was within the NaY zeolite super cage.

Comparative Example 5b

To compare the effectiveness of inventive catalytic compositions, the procedure of Example 5a was repeated with the substitution of gamma alumina powder for NaY zeolite powder. The rest of the procedure remained the same and resulted in a conventional rhodium and gamma alumina on alumina foam catalyst was identified as Catalyst 1. The rhodium metal cluster was attached to the exterior surface of the gamma alumina.

Example 6

Noble Metal and Sm—NaY Zeolite Catalyst Preparation

Sm—NaY zeolite powder produced by ion exchanging sodium in NaY zeolite with 0.4 molar samarium nitrate solution was prepared as described in Example 1. The Sm—NaY zeolite was annealed with air flowing at 600° Celsius for 3 hours, at 700° Celsius for 2 hours, and then at 300° Celsius for 12 hours with all heating and cooling rates at 10° Celsius per minute. The procedure of Example 5a was repeated with the substitution of 2.5 grams of Sm exchanged NaY zeolite powder in place of NaY zeolite powder to produce a catalytic composition containing a rhodium metal cluster and Sm—NaY zeolite. This catalyst was identified as Catalyst 3. The rhodium metal cluster was attached to the exterior surface of the NaY zeolite and not within the Sm—NaY super cage.

Example 7

Noble Metal Cluster within Sm—NaY Zeolite Catalytic Composition Preparation

Sm—NaY zeolite powder was prepared as described in Example 6. Rhodium (Rh) metal clusters were inserted into the super cage of the Sm—NaY zeolite by degassing the zeolite and the process of Example 2 repeated. The resulting 160 milligrams of (Rh metal cluster) Sm—NaY zeolite and 220 milligrams of alumina binder were mixed with water solvent and coated onto 6.1 grams of alumina foam with mechanical stirring and the evaporation of the solvent. The resultant coated foam was calcined at 700° Celsius for 15 hours to form a catalytic composition having rhodium metal clusters of 8 Angstrom diameter within the super cage of the Sm—NaY zeolite identified as Catalyst 4.

Example 8

Figure 3:
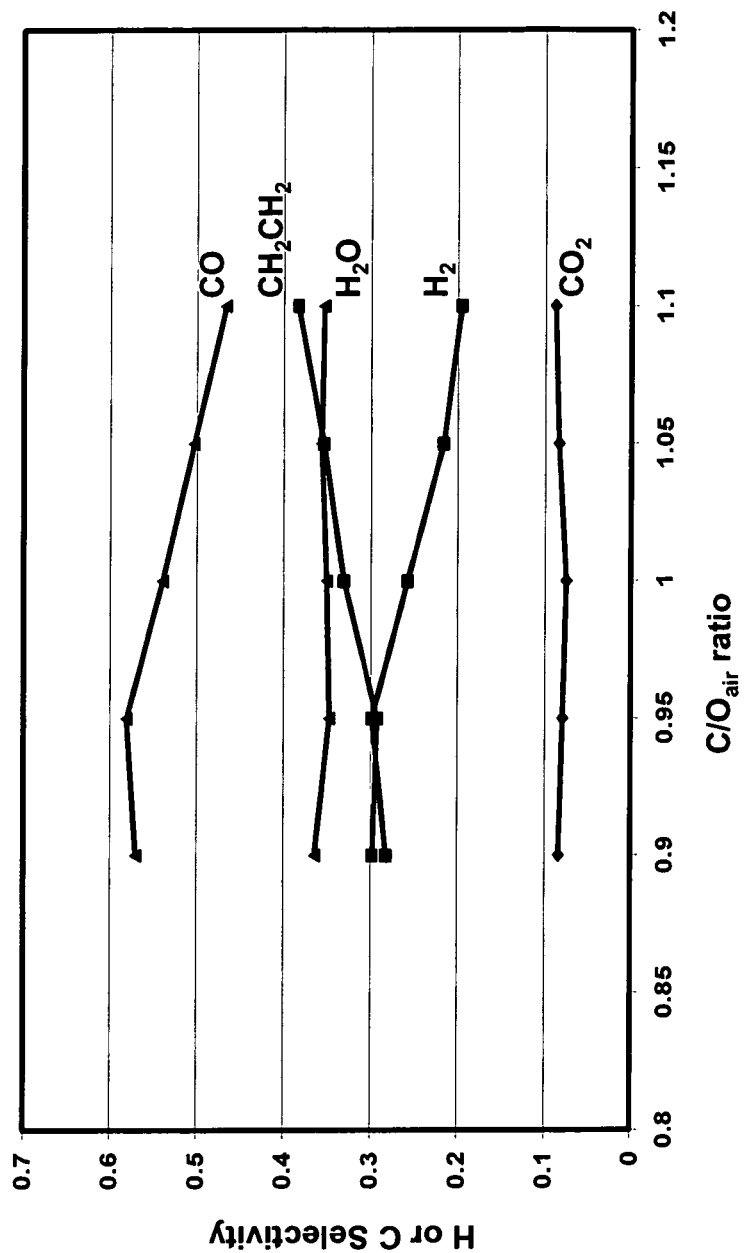
FIG. 3 is a plot of H or C selectivity as a function of $C/O_{air}$ ratio for JP-8 feedstock with a sulfur content of 1096 ppmw, direct reformation at $H_2O/C=0$ for a samarium stabilized NaY zeolite catalyst containing a rhodium metal cluster of between 2 and 15 Angstrom diameter within a NaY zeolite super cage.
Figure 4:
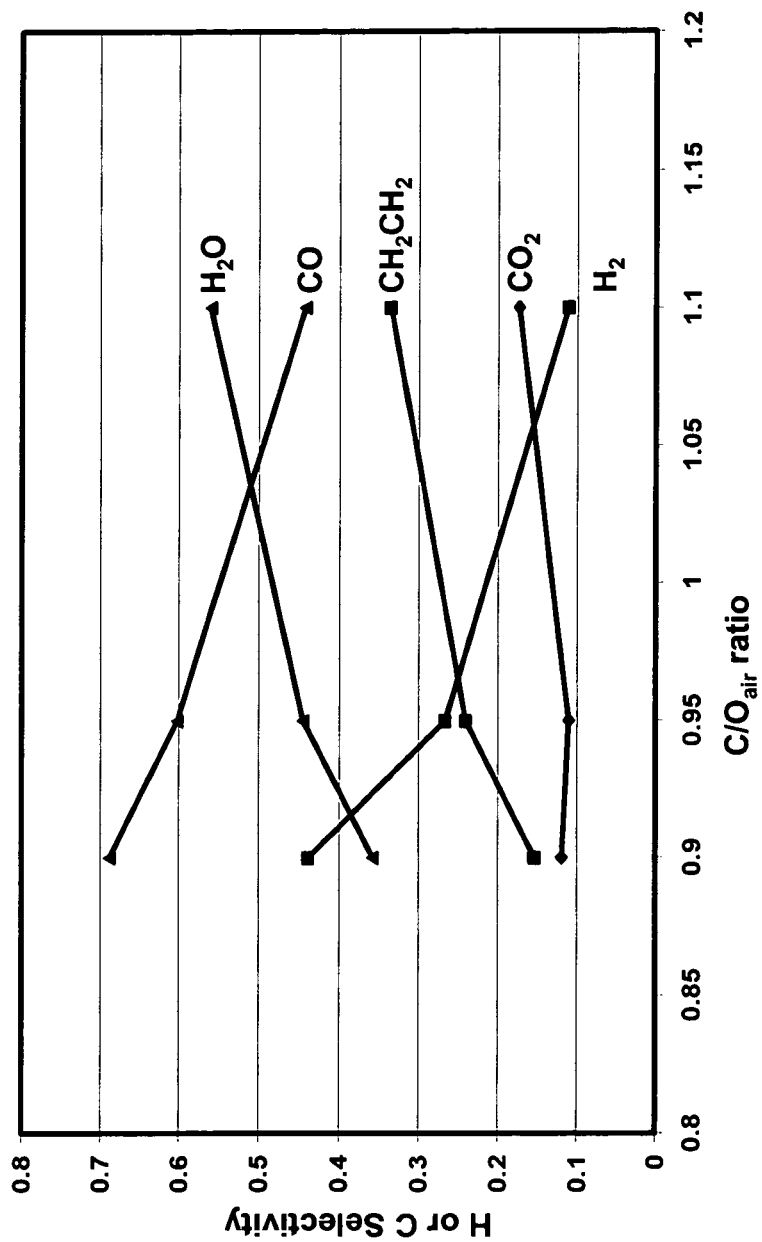
FIG. 4 is a plot of H or C selectivity as a function of $C/O_{air}$ ratio for JP-8 feedstock with a sulfur content of 1096 ppmw, direct reformation at $H_2O/C=1$ for a samarium stabilized NaY zeolite catalyst containing a rhodium metal cluster of between 2 and 15 Angstrom diameter within a NaY zeolite super cage.
Figure 5:
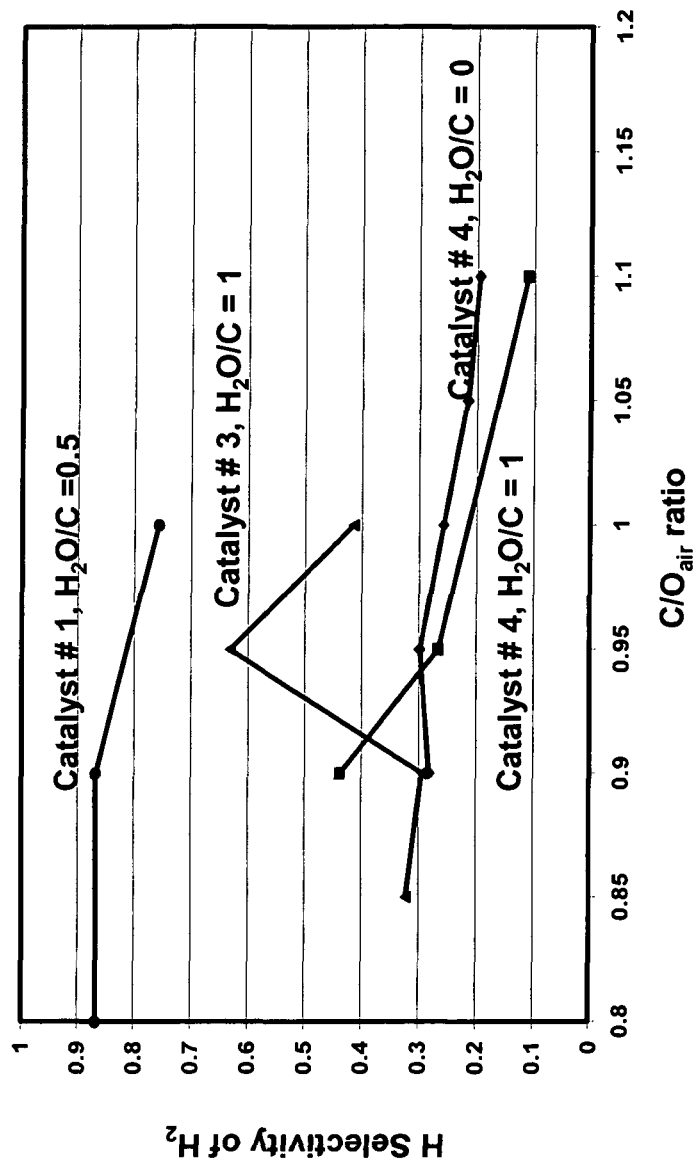
FIG. 5 is a plot of H selectivity of hydrogen as a function of $C/O_{air}$ ratio for JP-8 feedstock with a sulfur content of 1096 ppmw, direct reformation with rhodium attached to alumina at $H_2O/C=0.5$ (●), rhodium noble metal catalyst on alumina along with samarium stabilized NaY zeolite at $H_2O/C=1$ (▲), samarium stabilized NaY zeolite containing 2 to 15 Angstrom rhodium noble metal domains within the volume of the zeolite super cage supported on alumina at $H_2O/C=0$ (♦), and samarium stabilized NaY zeolite containing 2 to 15 Angstrom rhodium noble metal domains within the volume of the zeolite super cage supported on alumina at $H_2O/C=1$ (■).

(Prophetic)—Tungsten Carbide Nanotube with Rhodium Metal Cluster within Catalyst Preparation Alumina foam is coated with a slurry of 50 milligrams of tungsten carbide nanotubes containing rhodium metal clusters formed according to the procedure of Example 4 along with 220 milligrams of alumina binder. The tungsten carbide nanotubes containing rhodium metal clusters and alumina binder coating the alumina foam are calcined together at 700° Celsius for 15 hours to produce a catalyst identified as Catalyst 5. The rhodium metal cluster is surrounded by the tungsten carbide nanotube.

selectivity for Catalyst 4 operating at $H_2O/C$ of 0 is reported in FIG. 3 as a function of $C/O_{air}$ ratio with the quantity of reaction products reported. H or C selectivity for Catalyst 4 as a function of $C/O_{air}$ ratio is reported in FIG. 4 for an $H_2O/C$ ratio of 1. H selectivity of hydrogen plotted for comparative Catalyst 1 as well as Catalysts 3 and Catalyst 4 under the $H_2O/C$ ratios is reported in FIG. 5 as a function of $C/O_{air}$ ratio. It is noted that Catalyst 5 has operational selectivity comparable to that of Catalyst 4 with less activity decay compared to Catalysts 1-4. The inventive process yields a total hydrogen and carbon monoxide concentration, i.e. water free, nitrogen gas free, of between 84 and 93 percent of theoretical yield.

Selected performance results of Catalysts 1, 3 and 4 are shown in Table 3. Under the optimum conditions ($H_2O/C$, C/O, gas hourly space velocity or GHSV) in Runs B, C and D, the total concentration of hydrogen and carbon monoxide for Catalysts 1, 3 and 4 were 93.0%, 93.2% and 83.6% respectively. Catalyst 3 gave the lowest catalyst temperature which resulted in slowest catalyst aggregation. However, Catalyst 4 performed better to give higher total concentration than Catalyst 3 under certain conditions as in Runs A and B. In other conditions (Runs E and F), Catalyst 1 performed better than Catalyst 3.

TABLE 3

Reformate gas output for reforming JP-8 with 1096 ppmw sulfur

| Test Run | Catalyst | GHSV at 1173° K. | Catalyst Temp. | C/O | $H_2O/C$ | $H_2$ | CO | $CO_2$ | ($H_2$ + CO) |
|---|---|---|---|---|---|---|---|---|---|
| A | Catalyst 3 | 332,000 hr$^{-1}$ | 887° C. | 0.9 | 1 | 28.0% | 47.6% | 7.7% | 75.6% |
| B | Catalyst 4 | 332,000 hr$^{-1}$ | 845° C. | 0.9 | 1 | 34.4% | 49.2% | 8.5% | 83.6% |
| C | Catalyst 1 | 240,271 hr$^{-1}$ | 873° C. | 0.9 | 0 | 42.2% | 50.9% | 4.1% | 93.0% |
| D | Catalyst 3 | 337,000 hr$^{-1}$ | 832° C. | 0.95 | 1 | 41.5% | 52.0% | 4.6% | 93.2% |
| E | Catalyst 1 | 286,000 hr$^{-1}$ | 867° C. | 0.9 | 0.5 | 45.4% | 46.5% | 6.1% | 91.9% |
| F | Catalyst 3 | 286,000 hr$^{-1}$ | 905° C. | 0.9 | 0.5 | 39.8% | 47.6% | 7.4% | 87.3% |

Example 9

Operational Performance of Catalysts

Figure 2:
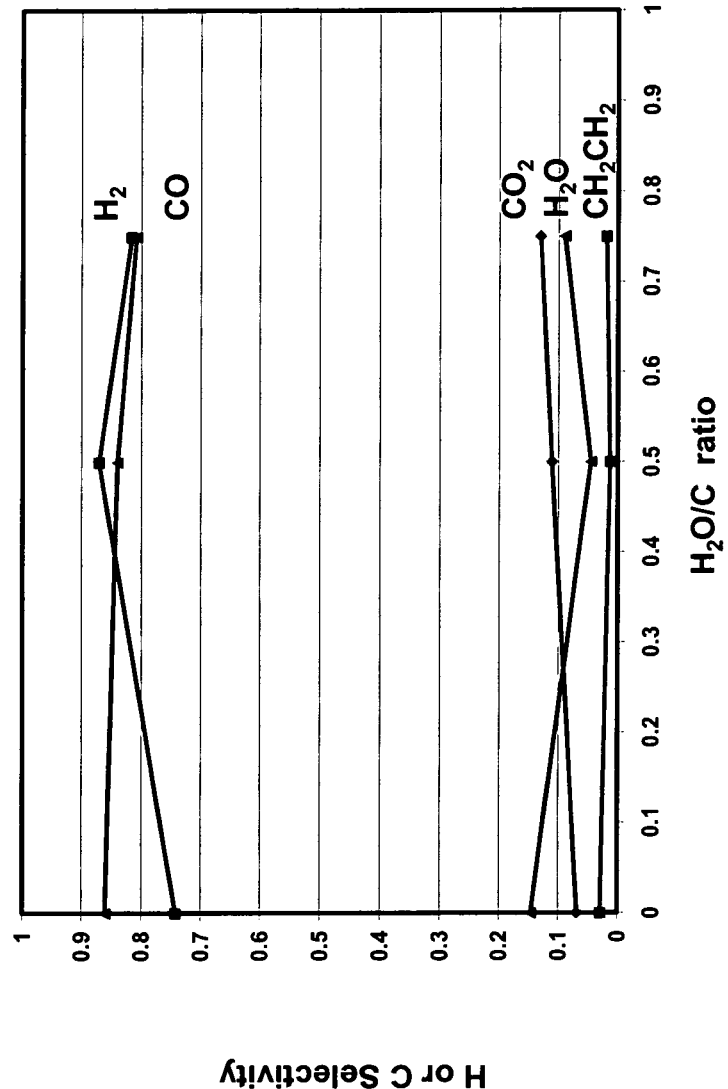
FIG. 2 is a plot of H or C selectivity as a function of reformation $H_2O/C$ ratio for JP-8 feedstock having a sulfur content of 1096 parts per million by weight (ppmw), direct reformation at $C/O_{air}=0.9$ for a rhodium noble metal catalyst adhered to an alumina support.
Figure 6:
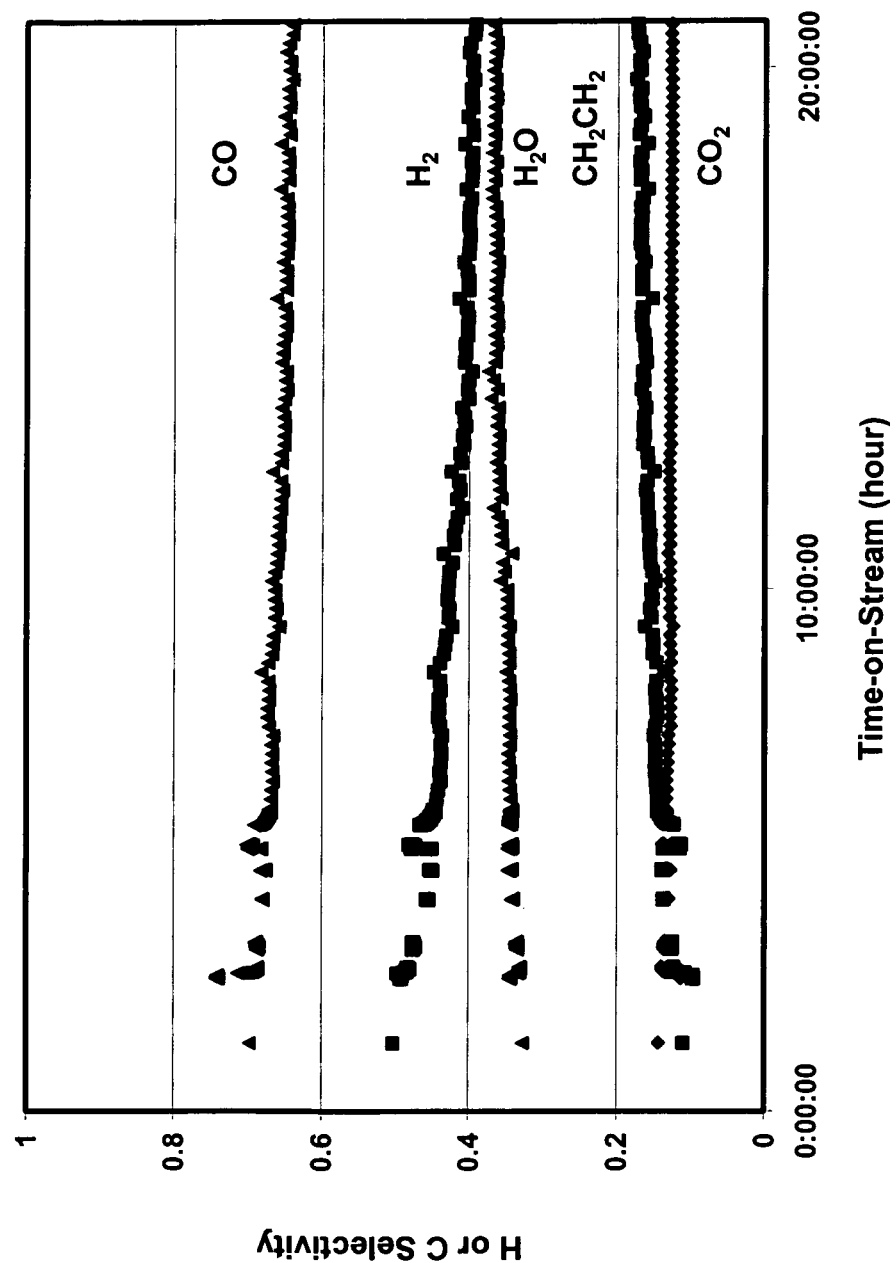
FIG. 6 is a plot of H or C selectivity as a function of time-on-stream (operating time) for JP-8 feedstock, a sulfur content of 1096 ppmw, $H_2O/C=0.75$ and $C/O_{air}=0.9$ for a rhodium noble metal catalyst on alumina along with samarium stabilized NaY zeolite.

The basis for calculating H selectivity for hydrogen gas production based on steam addition should be identified. Counting all reformate water produced in total H production underestimates H selectivity with excess water added effectively lowering selectivity. In the alternative, not counting reformate water in total H production overestimates H selectivity. Therefore in the data reported herein, additional water is reported in the total H selectivity only. That is, water in reformate ($H_2O_{ref}$) less feed water ($H_2O_{feed}$) is counted to give a direct comparison with dry reformation. H selectivity of a given species A as used herein is equal to H atoms from species A divided by total H atoms (fuel plus $H_2O_{ref}$-$H_2O_{feed}$). The H or C selectivity of Catalyst 1 operating at C/O ratio of 0.9 is reported in FIG. 2 as a function of $H_2O/C$ ratio. Due to thermal instability of zeolite structure in Catalyst 2, the activity of Catalyst 2 degraded continuously once the reaction started. The H or C selectivity as a function of hours continuous testing for Catalyst 3 is reported in FIG. 6 for a hydrocarbon feedstock of JP-8 containing 1096 ppmw sulfur and operating at C/O of 0.9 and $H_2O/C$ of 0.5. The H or C GSHV—Gas Hourly Space Velocity Patents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

What is claimed is:

1. A catalytic composition for increasing the rate of conversion of a sulfur-containing hydrocarbon feedstock and an oxygen donor to hydrogen and carbon monoxide at temperatures less than or equal to 1000° Celsius, the catalytic composition comprising:
   a Y-zeolite that comprises
      an exterior surface,
      an interior volume having an interior cross-sectional area ranging from 36 to 225 square Angstroms, and a passage providing fluid communication for a hydrocarbon having at least 6 carbon atoms between the exterior surface and the interior volume; and a noble metal cluster having an X-Y-Z axial mean linear dimension of between 2 and 15 Angstroms within the interior volume, wherein the Y-zeolite stabilizes the X-Y-Z axial mean linear dimension of the noble metal cluster against aggregation at temperatures up to 1000° Celsius and further wherein the catalytic composition increases the rate of conversion of a sulfur-containing hydrocarbon feedstock and an oxygen donor to hydrogen and carbon monoxide at temperatures less than or equal to 1000° Celsius at a yield of said conversion of at least 80 percent.

2. The catalytic composition of claim 1 wherein the noble metal cluster is formed of a noble metal selected from the group consisting of rhodium, platinum, palladium and combinations thereof.

3. The catalytic composition of claim 1 wherein the noble metal cluster is formed of a noble metal consisting of rhodium.

4. The catalytic composition of claim 1 wherein the sulfur-containing hydrocarbon feedstock is selected from the group consisting of Jet-A, Jet-A1, JP-4, JP-5, JP-8, kerosene, gasoline, diesel fuel and mixtures thereof.

5. The catalytic composition of claim 4 wherein the Y zeolite is a rare earth stabilized Y zeolite comprising at least one rare earth atom selected from the group consisting of samarium, dysprosium, and erbium.

6. The catalytic composition of claim 1 wherein the catalytic composition comprises at least one rare earth atom selected from the group consisting of samarium, dysprosium, and erbium.

7. The catalytic composition of claim 1 wherein the Y zeolite has an exterior surface area of between 170 and 350 meters$^2$ per gram at 925° Celsius.

8. The catalytic composition of claim 1 wherein the catalytic composition comprises a nanotube selected from the group consisting of a tungsten carbide nanotubes and a titanium carbide nanotubes.

9. The catalytic composition of claim 1 wherein the noble metal cluster is formed of a noble metal selected from the group consisting of rhodium, platinum, palladium, and combinations thereof.

10. The catalytic composition of claim 1 wherein the noble metal cluster comprises rhodium.

11. A catalytic composition for increasing the rate of conversion of a hydrocarbon feedstock to hydrogen and carbon monoxide at temperatures less than or equal to 1000° Celsius, the catalytic composition comprising a Y zeolite comprising an exterior surface having a surface area of between 170 and 350 meters$^2$ per gram at 925° Celsius, and having cages containing a rare earth atom selected from the group consisting of samarium, dysprosium, and erbium, an interior volume having a cross-sectional area ranging from 36 to 225 square Angstroms, and a passage adapted to provide fluid communication for a hydrocarbon having at least 6 carbon atoms between the exterior surface and the interior volume; and a rhodium cluster having an X-Y-Z axial mean linear dimension of between 2 and 15 Angstroms, within the interior volume, wherein the Y zeolite stabilizes the X-Y-Z axial mean linear dimension of the rhodium cluster against aggregation at temperatures up to 1000° Celsius and further wherein the catalytic composition increases the rate of conversion of a hydrocarbon feedstock to hydrogen and carbon monoxide at temperatures less than or equal to 1000° Celsius to a yield of said conversion of at least 84 percent.

12. The catalytic composition of claim 11 wherein the Y zeolite is stabilized to form rare earth stabilized Y-zeolite and the rare earth atom is selected from the group consisting of 10 ppmw to 2 wt % samarium, 40 ppmw to 3 wt % dysprosium and 20 ppmw to 3 wt % erbium.

13. The catalytic composition of claim 1 wherein the noble metal cluster is formed of a noble metal selected from the group consisting of rhodium, platinum, palladium, and combinations thereof.

14. The catalytic composition of claim 1 wherein the catalytic composition is formed from Sm—Na Y-Zeolite powder that comprises a super cage and rhodium metal clusters inserted into the super cage of the Sm—Na Y-Zeolite powder by degassing the zeolite.

15. The catalytic composition of claim 1 wherein the composition is used in a process for reformation of hydrocarbon feedstock to hydrogen and carbon monoxide comprising:

preheating the catalytic composition to a preheating temperature of between 250 and 400° Celsius and exposing the catalytic composition to the hydrocarbon feedstock and a gaseous oxygen atom donating reactant to a reaction temperature for a period of time sufficient to reform hydrocarbon feedstock to hydrogen and carbon monoxide.

16. The catalytic composition of claim 11 wherein the Y zeolite is a rare earth stabilized Y zeolite.

17. The catalytic composition of claim 1 wherein the Y zeolite is a rare earth stabilized Y zeolite and the noble metal cluster is formed of a noble metal selected from the group consisting of rhodium, platinum, palladium, and a combination thereof.

18. The catalytic composition of claim 1 wherein the Y zeolite is a rare earth stabilized Y zeolite having an exterior surface area of between 170 and 350 Meters$^2$ per gram at 925° Celsius.

19. The catalytic composition of claim 1 wherein the sulfur-containing hydrocarbon feedstock has a sulfur content of at least 500 parts per million by weight.

20. The catalytic composition of claim 1 wherein the sulfur-containing hydrocarbon feedstock has an average sulfur content of at least 1000 parts per million by weight.

21. The catalytic composition of claim 1 wherein the sulfur-containing hydrocarbon feedstock is JP-8.

22. The catalytic composition of claim 1 wherein the catalytic composition increases the rate of conversion of a sulfur-containing hydrocarbon feedstock and an oxygen donor to hydrogen and carbon monoxide at temperatures in the range of from 800 to 1000° Celsius.

23. The catalytic composition of claim 1 wherein the catalytic composition increases the rate of conversion of a sulfur-containing hydrocarbon feedstock and an oxygen donor to hydrogen and carbon monoxide at temperatures in the range of from 800 to 1000° Celsius to a yield of said conversion of at least 84 percent.

24. The catalytic composition of claim 1 wherein the noble metal cluster is attached to the exterior surface of the Y-zeolite.

* * * * *

UNITED STATES PATENT AND TRADEMARK OFFICE
CERTIFICATE OF CORRECTION

| | | |
|---|---|---|
| PATENT NO. | : 8,709,378 B2 | Page 1 of 1 |
| APPLICATION NO. | : 12/014910 | |
| DATED | : April 29, 2014 | |
| INVENTOR(S) | : Ivan Chihang Lee | |

It is certified that error appears in the above-identified patent and that said Letters Patent is hereby corrected as shown below:

In the Claims

After Claim 24, beginning at Column 12, line 65, add:

-- 25. A process for reformation of hydrocarbon feedstock to hydrogen carbon monoxide comprising:

preheating the catalytic composition of claim 1 to a preheating temperature of between 250 and 400°; and exposing the catalytic composition to the hydrocarbon feedstock and a gaseous oxygen atom donating reactant to a reaction temperature for a period of time sufficient to reform hydrocarbon feedstock to hydrogen and carbon monoxide.

26. The process of claim 25 wherein the hydrocarbon feedstock is a jet fuel and the Y zeolite of catalytic composition is a rare earth stabilized Y zeolite.

27. The process of claim 25 further comprising:

adding water and air to the hydrocarbon feedstock, wherein the water is added in a ratio of water/carbon in the feedstock of 0 to 1 and the air is added in a carbon in the feedstock/oxygen in air ratio of 0.9 to 1.0. --

Signed and Sealed this
Twenty-ninth Day of July, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,709,378 B2 | Page 1 of 1 |
| APPLICATION NO. | : 12/014910 | |
| DATED | : April 29, 2014 | |
| INVENTOR(S) | : Ivan Chihang Lee | |

It is certified that error appears in the above-identified patent and that said Letters Patent is hereby corrected as shown below:

On the title page, under abstract "24 Claims, 6 Drawing Sheets" should read -- 27 Claims, 6 Drawing Sheets --

In the Claims

After Claim 24, beginning at Column 12, line 65, add:

-- 25. A process for reformation of hydrocarbon feedstock to hydrogen carbon monoxide comprising:

preheating the catalytic composition of claim 1 to a preheating temperature of between 250 and 400°; and exposing the catalytic composition to the hydrocarbon feedstock and a gaseous oxygen atom donating reactant to a reaction temperature for a period of time sufficient to reform hydrocarbon feedstock to hydrogen and carbon monoxide.

26. The process of claim 25 wherein the hydrocarbon feedstock is a jet fuel and the Y zeolite of catalytic composition is a rare earth stabilized Y zeolite.

27. The process of claim 25 further comprising:

adding water and air to the hydrocarbon feedstock, wherein the water is added in a ratio of water/carbon in the feedstock of 0 to 1 and the air is added in a carbon in the feedstock/oxygen in air ratio of 0.9 to 1.0. --

This certificate supersedes the Certificate of Correction issued July 29, 2014.

Signed and Sealed this
Nineteenth Day of August, 2014

Michelle K. Lee
*Deputy Director of the United States Patent and Trademark Office*